(12) United States Patent
Ishikawa

(10) Patent No.: US 11,042,435 B2
(45) Date of Patent: Jun. 22, 2021

(54) CIRCUIT APPARATUS, ELECTRO-OPTICAL APPARATUS, ELECTRONIC DEVICE, AND MOBILE UNIT

(71) Applicant: SEIKO EPSON CORPORATION, Tokyo (JP)

(72) Inventor: Atsushi Ishikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/423,800

(22) Filed: May 28, 2019

(65) Prior Publication Data

US 2019/0370109 A1 Dec. 5, 2019

(30) Foreign Application Priority Data

May 29, 2018 (JP) .............................. JP2018-102168

(51) Int. Cl.
*G06F 11/10* (2006.01)
*G09G 3/20* (2006.01)

(52) U.S. Cl.
CPC ....... *G06F 11/1004* (2013.01); *G09G 3/2085* (2013.01)

(58) Field of Classification Search
None
See application file for complete search history.

(56) References Cited

U.S. PATENT DOCUMENTS

| | | | |
|---|---|---|---|
| 7,872,627 B2 | 1/2011 | Fushimi | |
| 8,576,258 B2 | 11/2013 | Chen et al. | |
| 8,654,155 B2 | 2/2014 | Yu et al. | |
| 9,405,608 B2* | 8/2016 | Okubo | ............... G06F 11/073 |
| 2004/0250028 A1* | 12/2004 | Daniels | ............... G06F 11/0727 |
| | | | 711/156 |
| 2005/0156837 A1* | 7/2005 | Kasai | ............... G09G 3/3275 |
| | | | 345/77 |
| 2009/0160882 A1* | 6/2009 | Kiya | ............... G09G 3/2007 |
| | | | 345/690 |
| 2014/0068374 A1 | 3/2014 | Ha et al. | |
| 2014/0281661 A1* | 9/2014 | Milton | ............... G06F 11/076 |
| | | | 714/2 |

FOREIGN PATENT DOCUMENTS

JP 2011-164708 A 8/2011

* cited by examiner

*Primary Examiner* — April Y Blair
*Assistant Examiner* — Matthew W Wahlin
(74) *Attorney, Agent, or Firm* — Oliff PLC

(57) ABSTRACT

A circuit apparatus 100 includes: an interface circuit 120 that receives setting data; and a control circuit 110 that controls the operations of the circuit apparatus 100 based on the setting data and also controls access to a nonvolatile memory 10. The control circuit 110 generates error detection data based on the setting data received by the interface circuit 120, and writes the setting data and the error detection data to the nonvolatile memory 10.

13 Claims, 9 Drawing Sheets

CIRCUIT APPARATUS, ELECTRO-OPTICAL APPARATUS, ELECTRONIC DEVICE, AND MOBILE UNIT

The present application is based on, and claims priority from JP Application Serial Number 2018-102168, filed May 29, 2018, the disclosure of which is hereby incorporated by reference herein in its entirety.

BACKGROUND

1. Technical Field

The present invention relates to a circuit apparatus, an electro-optical apparatus, an electronic device, a mobile unit, and the like.

2. Related Art

As methods for checking for an error in data, for example, methods such as CRC (Cyclic Redundancy Check) and checksum are known. In these methods, an expected value of a check code computed from original data is compared with a check code computed from data to be subjected to error detection, and then it is determined whether not the expected value and the check code match each other.

A related technique in which such an error detection method is applied to a nonvolatile memory is disclosed in JP-A-2011-164708. According to JP-A-2011-164708, a ROM is provided outside of a liquid crystal display apparatus, and the ROM stores control data and an expected value of a check code. The liquid crystal display apparatus includes a control apparatus, and the control apparatus loads setting data from the ROM to a setting register. The control apparatus computes a check code from the setting data stored in the setting register. Then, when the power supply voltage of the setting register undergoes a variation that deviates from predetermined permission conditions, the control apparatus performs error detection by comparing the check code obtained as a result of computation and the expected value of the check code read out from the ROM.

JP-A-2011-164708 is an example of related art.

As described above, the check code is stored in the nonvolatile memory when performing detection of an error in the data stored in the nonvolatile memory. However, JP-A-2011-164708 does not disclose in what way the check code stored in the nonvolatile memory is prepared. The control apparatus disclosed in JP-A-2011-164708 is not configured to write data to the nonvolatile memory, and it is therefore assumed that the check code is computed outside of the control apparatus, and the computed check code is written to the nonvolatile memory together with the setting data. Accordingly, in JP-A-2011-164708, it is necessary to compute the check code outside of the control apparatus when writing the setting data to the nonvolatile memory, which makes the procedure complex.

SUMMARY

An advantage of some aspects of the invention relates to a circuit apparatus including: an interface circuit that receives setting data; and a control circuit that controls operations of the circuit apparatus based on the setting data and also controls access to a nonvolatile memory, wherein the control circuit generates error detection data based on the setting data received by the interface circuit, and writes the setting data and the error detection data to the nonvolatile memory.

Also, according to one aspect of the invention, the control circuit may include a computation unit, and the computation unit may generate the error detection data based on the setting data received by the interface circuit.

Also, according to one aspect of the invention, the circuit apparatus may include a register, the interface circuit may write the received setting data to the register, and the control circuit may generate the error detection data based on the setting data written to the register.

Also, according to one aspect of the invention, the control circuit may read out the setting data and the error detection data from the nonvolatile memory, and generate comparison data based on the setting data read out from the nonvolatile memory, the comparison data being data to be compared with the error detection data.

Also, according to one aspect of the invention, the control circuit may compare the error detection data and the comparison data.

Also, according to one aspect of the invention, the control circuit may include a comparison unit, and the comparison unit may compare the error detection data and the comparison data.

Also, according to one aspect of the invention, the control circuit may output an error detection signal based on a comparison result.

Also, according to one aspect of the invention, the control circuit may count the number of times that a comparison result indicates that the error detection data and the comparison data do not match each other, and output an error detection signal if the count value reaches n (where n is an integer of 1 or more).

Also, according to one aspect of the invention, the circuit apparatus may include the nonvolatile memory.

Also, according to one aspect of the invention, the circuit apparatus may include a driving circuit that drives an electro-optical panel, and the setting data may be data that is used to set a voltage used by the driving circuit.

Also, another aspect of the invention relates to an electro-optical apparatus that includes an electro-optical panel; and the circuit apparatus according to the aspect described above that drives the electro-optical panel.

Also, still another aspect of the invention relates to an electronic device that includes the circuit apparatus according to the aspect described above.

Also, still another aspect of the invention relates to a mobile unit that includes the circuit apparatus according to the aspect described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail. It is to be noted that the embodiments described below are not intended to unduly limit the scope of the invention recited in the appended claims, and not all configurations described in the embodiments are necessarily essential to the solution presented by the invention.

1. Circuit Apparatus

Figure 1:
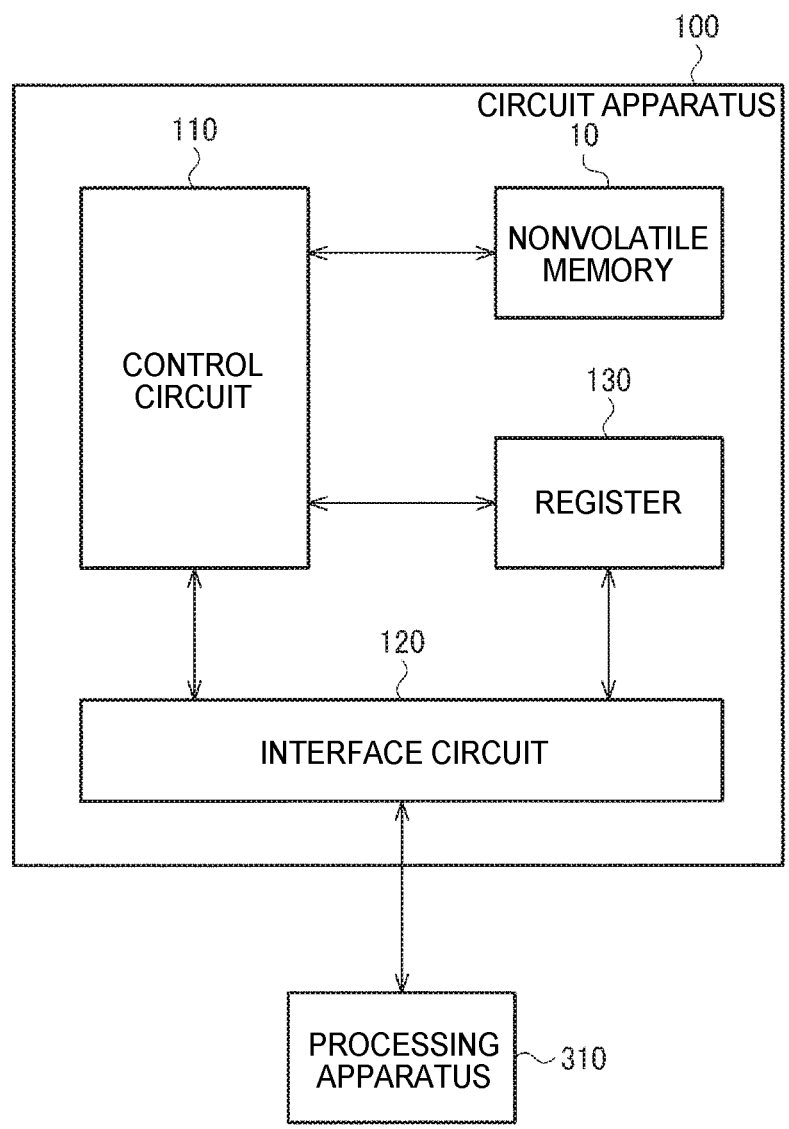
FIG. 1 is a first configuration example of a circuit apparatus.

FIG. 1 shows a first configuration example of a circuit apparatus 100. The circuit apparatus 100 includes a nonvolatile memory 10, a control circuit 110, an interface circuit 120, and a register 130. The circuit apparatus 100 may be, for example, an integrated circuit apparatus. As will be described with reference to FIG. 6, the nonvolatile memory 10 may be provided outside of the circuit apparatus 100.

The interface circuit 120 performs communication between the circuit apparatus 100 and a processing apparatus 310 provided outside of the circuit apparatus 100. The interface circuit 120 receives setting data from the processing apparatus 310, and writes the setting data to the register 130. The setting data includes, for example, a register setting value, a command, and the like. Also, the interface circuit 120 transmits various types of data to the processing apparatus 310. The data transmitted to the processing apparatus 310 may be, for example, data read out from the register 130. Examples of the communication method used by the interface circuit 120 include an SPI (Serial Peripheral Interface) method, an I2C (Inter Integrated Circuit) method, an LVDS (Low Voltage Differential Signaling) method, an RGB serial interface method, and the like.

The processing apparatus 310 is a controller that controls the circuit apparatus 100, and may be, for example, a processor or an ASIC (Application Specific Integrated Circuit). As the processor, for example, a CPU (Central Processing Unit), an MPU (Micro Processor Unit), a DSP (Digital Signal processor), or the like may be used. For example, in the case where the circuit apparatus 100 is a display driver, and the processing apparatus 310 is a controller for controlling the display driver, the expression "control of the circuit apparatus 100 by the processing apparatus 310" means, for example, transmitting image data and horizontal and vertical synchronization data signals from the processing apparatus 310 to the circuit apparatus 100, transmitting display state data, and the like.

The control circuit 110 controls the circuit apparatus 100. Specifically, the control circuit 110 reads out the setting data stored in the register 130, and controls the operations of the circuit apparatus 100 based on the setting data. Also, the control circuit 110 controls access to the nonvolatile memory 10. That is, the control circuit 110 transmits an address, data, and a write signal to the nonvolatile memory 10, and the nonvolatile memory 10 writes the data in a memory area designated by the address. Also, the control circuit 110 transmits an address and a readout signal to the nonvolatile memory 10, and the nonvolatile memory 10 reads out data from a memory area designated by the address, and transmits the read-out data to the control circuit 110. The control circuit 110 may be implemented by a logic circuit. For example, the control circuit 110 may be a gate array circuit or a standard cell array circuit. For example, in the case where the circuit apparatus 100 is a display driver, the expression "control of the circuit apparatus 100 by the control circuit 110" means setting the voltage of a display output line, turning the gate of a display element on and off, and the like.

As used herein, the gate array circuit refers to an array circuit in which logic cells are automatically arranged and signal lines are automatically provided. Also, in a standard cell array circuit, the logic cells are standardized cells. The standard cell array circuit refers to an array circuit in which signal lines are automatically provided in a logic cell array.

The register 130 stores setting data used to set the operations of the circuit apparatus 100. For example, the register 130 includes a plurality of latch circuits or a plurality of flip-flop circuits, and the plurality of latch circuits or the plurality of flip-flop circuits store the setting data. The register 130 and the control circuit 110 may be configured by a unitary gate array circuit or standard cell circuit.

The nonvolatile memory 10 is a nonvolatile storage device that can hold and store data even when power is not supplied. The nonvolatile memory 10 includes a plurality of word lines, a plurality of bit lines, and a plurality of memory cells. Also, the nonvolatile memory 10 may include a word line selection circuit that selects a word line, a readout control circuit that performs control so as to read data from the memory cells, and a write control circuit that performs control so as to write data to the memory cells.

The readout control circuit includes a sense amplifier that is connected to the bit lines. When the nonvolatile memory 10 receives an address, data, and a write signal, the word line selection circuit selects a word line that corresponds to the address, and the write control circuit outputs a signal that corresponds to the data to the bit lines. Through this, the data is written to the memory cells that are connected to the selected word line. When the nonvolatile memory 10 receives an address and a readout signal, the word line selection circuit selects a word line that corresponds to the address. Through this, a signal is output from the memory cells that are connected to the selected word line to the bit lines. The readout control circuit reads out data based on the signal.

The nonvolatile memory 10 may be, for example, an OTP (One Time Programmable) device. As the nonvolatile memory 10, for example, a FAMOS (Floating gate Avalanche injection MOS) or the like can be used. The FAMOS is a memory in which electric charges are accumulated at a floating gate through avalanche injection. Alternatively, the nonvolatile memory 10 may be an EEPROM (Electrically Erasable Programmable Read-Only Memory) in which data can be electrically erased. Alternatively, the nonvolatile memory 10 may be a memory in which fuse cells are used. In this type of memory, a fuse cell that serves as a memory cell includes a resistance element and a selector element that is connected in series to the resistance element. The selector element may be, for example, a PN-junction diode. However, the selector element may be a MOS transistor. For example, one end of the resistance element is connected to a bit line, and the other end of the resistor is connected to the anode of the diode. The cathode of the diode is connected to a word line. The resistance element that functions as a fuse element is a programmable resistor whose resistance value is variable. For example, the resistance element includes a poly-resistor that has a high resistance value and a silicide that is formed on the top layer of the poly-resistor and has a low resistance value. As a result of a large current flowing through the silicide, the silicide melts, the resistance value of the resistance element changes from a low resistance value to a high resistance value, and data is thereby stored in the fuse element that serves as a memory cell.

Hereinafter, the operations of the circuit apparatus 100 will be described in detail. In the present embodiment, for example, setting data is programmed to the nonvolatile memory 10 in advance during production of an electronic device that includes a circuit apparatus 100. When the circuit apparatus 100 performs normal operations such as, for example, when a user uses the electronic device, the setting data is loaded from the nonvolatile memory 10 to the register 130.

First, operations performed during programming will be described. When the interface circuit 120 receives the setting data from the processing apparatus 310, the interface circuit 120 writes the setting data to the register 130. The control circuit 110 reads the setting data from the register 130, and writes the setting data to the nonvolatile memory 10.

At this time, the control circuit 110 generates error detection data based on the setting data, and writes the error detection data to the nonvolatile memory 10 together with the setting data. The error detection data is data that is used to detect an error in the setting data stored in the nonvolatile memory 10. Specifically, the error detection data is an expected value for error detection. For example, the control circuit 110 computes a CRC detection code from the setting data. In this case, the CRC detection code serves as the error detection data. The CRC detection code may also be referred to as "CRC value". Alternatively, the control circuit 110 computes a checksum detection code from the setting data. In this case, the checksum detection code serves as the error detection data. The checksum detection code may also be referred to as "checksum value".

According to the present embodiment, the error detection data is generated based on the setting data received by the interface circuit 120, and the setting data and the error detection data are written to the nonvolatile memory 10. With this configuration, it is unnecessary to compute the error detection data outside of the circuit apparatus 100, and the procedure for storing the error detection data in the nonvolatile memory 10 can be simplified. That is, as a result of the processing apparatus 310 simply transmitting the setting data to the circuit apparatus 100, the circuit apparatus 100 automatically generates the error detection data internally, and stores the error detection data in the nonvolatile memory 10 together with the setting data. This eliminates the need to compute the error detection data through computation outside of the circuit apparatus 100 when the setting data is programmed to the nonvolatile memory 10 in advance during production as described above.

Next, operations performed during loading will be described. The control circuit 110 reads out the setting data from the nonvolatile memory 10, and writes the setting data to the register 130. This operation is performed, for example, when the circuit apparatus 100 is powered on, when the circuit apparatus 100 is initialized, or when a refresh operation of reloading the setting data is performed. The control circuit 110 controls the operations of the circuit apparatus 100 based on the setting data loaded to the register 130.

When the control circuit 110 reads out the setting data from the nonvolatile memory 10, the control circuit 110 generates comparison data from the setting data. Specifically, the control circuit 110 generates comparison data using the same computation method as that used to compute the error detection data. If the setting data read out from the nonvolatile memory 10 is the same as original setting data, the comparison data and the error detection data are the same data. The control circuit 110 reads out the error detection data from the nonvolatile memory 10, compares the error detection data with the comparison data, and outputs an error detection signal based on the comparison result. The circuit apparatus 100 includes an error detection signal output terminal, and the control circuit 110 outputs the error detection signal to the error detection signal output terminal. Alternatively, the control circuit 110 outputs the error detection signal to the interface circuit 120, and the interface circuit 120 outputs the error detection signal to the outside of the circuit apparatus 100.

The error detection signal is input to, for example, the processing apparatus 310, and in response to the input, the processing apparatus 310 performs an error detection operation based on the error detection signal. For example, the processing apparatus 310 performs processing for notifying the user of the electronic device of the fact that an error has been detected.

According to the present embodiment, the setting data and the error detection data are read out from the nonvolatile memory 10, and comparison data is generated based on the read-out setting data. With this configuration, the comparison data to be compared with the error detection data can be generated. Then, by determining whether or not the error detection data and the comparison data match each other, it is possible to detect an error in the setting data stored in the nonvolatile memory 10.

The data stored in the nonvolatile memory 10 may change over time. Also, for example, data may not be read out properly from the nonvolatile memory 10 due to a circuit failure such as a failure in the readout control circuit. Even if there is an anomaly in the setting data, depending on the anomaly, the circuit apparatus 100 can operate. However, it is generally desirable that the circuit apparatus 100 can operate under/with normal settings. According to the present embodiment, if an anomaly occurs in the setting data stored in the nonvolatile memory 10, the anomaly can be detected.

2. Detailed Configuration Example

Figure 2:
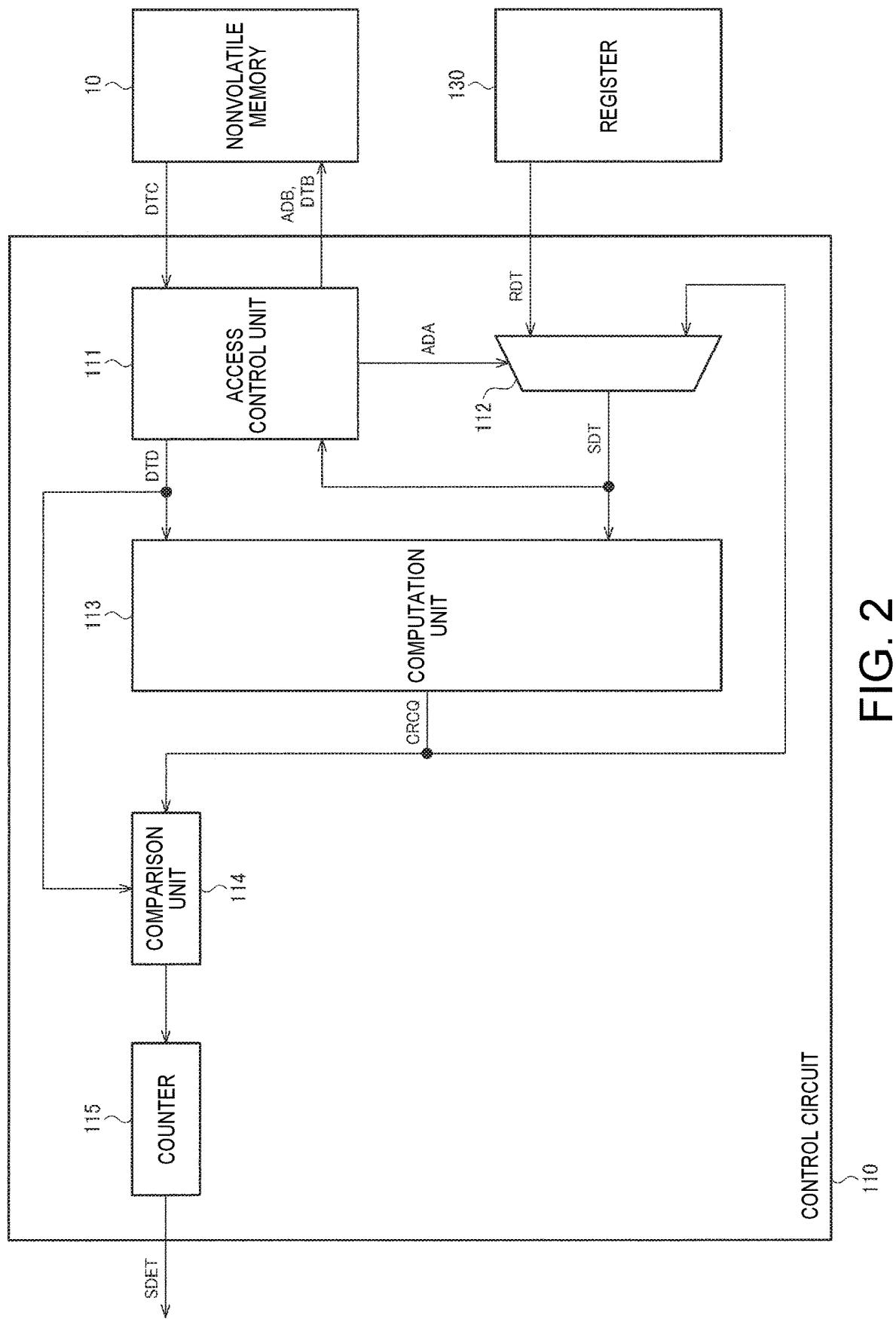
FIG. 2 is a detailed configuration example of a control circuit.

FIG. 2 shows a detailed configuration example of the control circuit 110. The control circuit 110 includes an access control unit 111, a selector 112, a computation unit 113, a comparison unit 114, and a counter 115. These constituent elements may be implemented by separate circuits. In this case, the access control unit 111 may be an access control circuit, the computation unit 113 may be a computation circuit, and the comparison unit 114 may be a comparator circuit. Alternatively, in the case where the control circuit 110 is implemented by a DSP, the functions of the access control unit 111, the selector 112, the computation unit 113, the comparison unit 114, and the counter 115 may be implemented as a result of the DSP executing processing in a time division manner. In FIG. 2, illustration of an address decoder for writing required data to the register, and the like is omitted.

Figure 3:
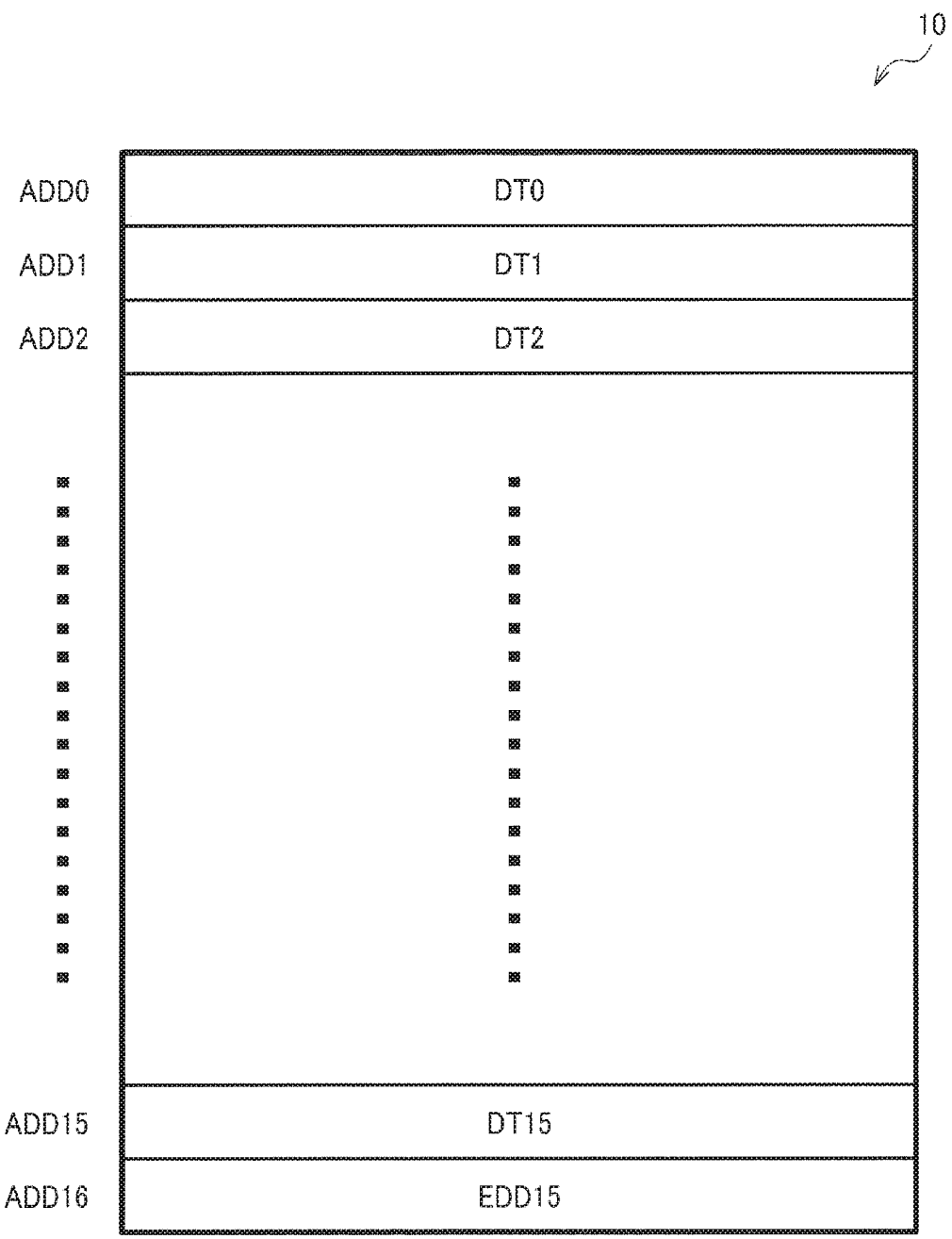
FIG. 3 is a diagram that schematically shows data stored in a nonvolatile memory.
Figure 4:
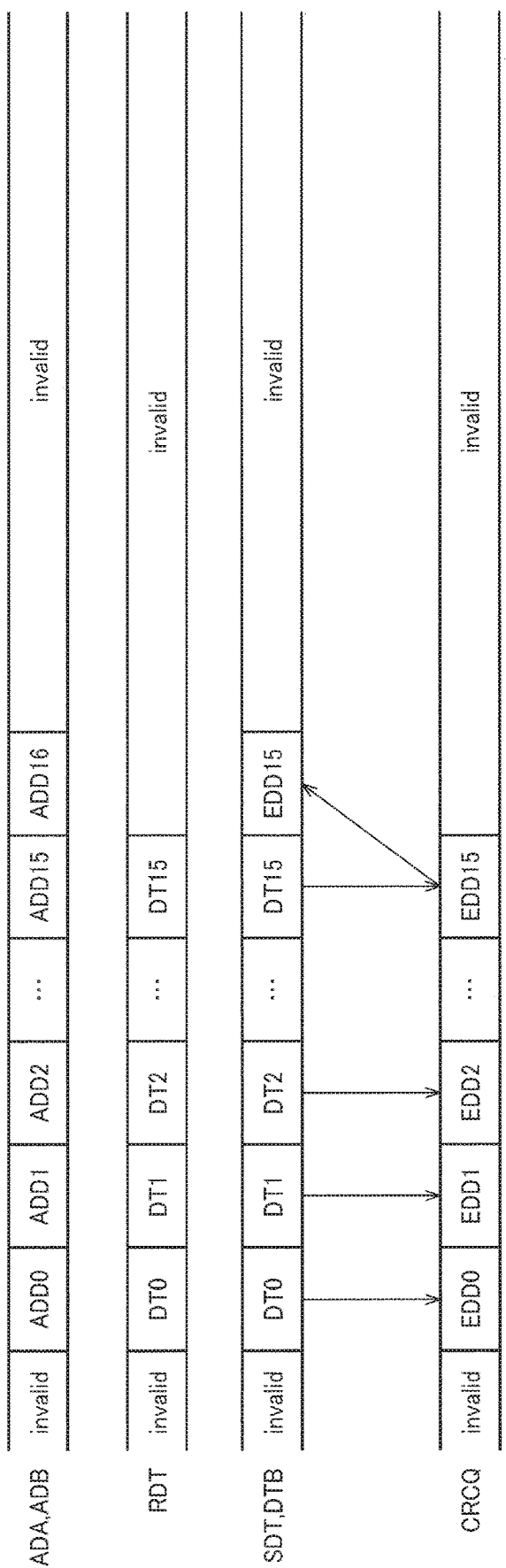
FIG. 4 is a diagram illustrating operations performed during programming.
Figure 5:
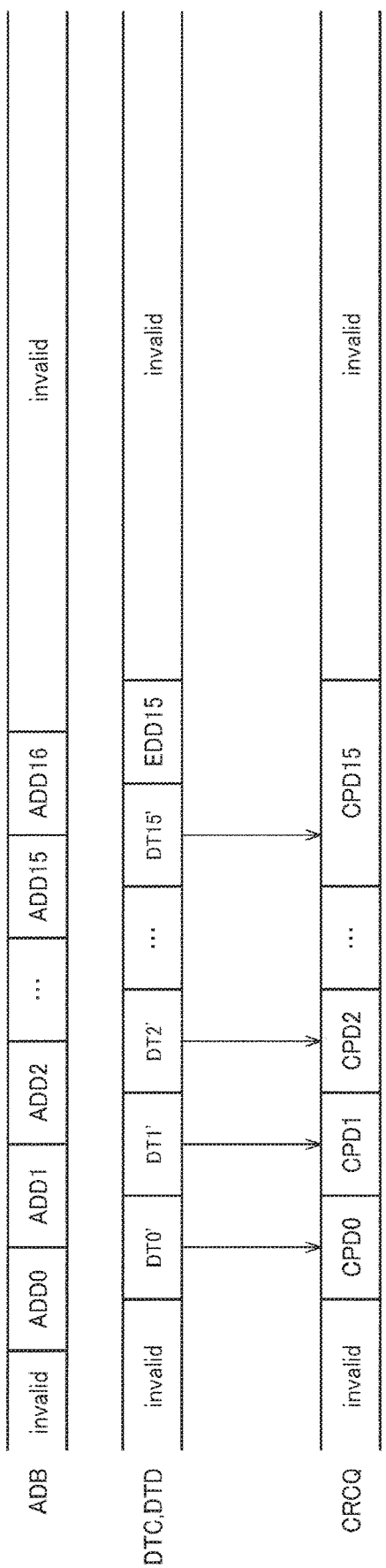
FIG. 5 is a diagram illustrating operations performed during loading.

The operations of the control circuit 110 will be described with reference to FIGS. 3 to 5. FIG. 3 is a diagram that schematically shows data stored in the nonvolatile memory

10. FIG. 4 is a diagram illustrating operations performed during programming. FIG. 5 is a diagram illustrating operations performed during loading. Hereinafter, an example will be described in which a CRC value is used as the detection code, but the method for obtaining the detection code is not limited to CRC.

As shown in FIG. 3, the nonvolatile memory 10 includes: memory areas with addresses ADD0 to ADD15 that are provided to store the setting data; and a memory area with an address ADD16 that is provided to store the error detection data. The setting data and the number of addresses are not limited to those shown in FIG. 3.

First, operations performed during programming will be described. It is assumed here that the setting data received from the processing apparatus 310 is already stored in the register 130. As shown in FIG. 4, the access control unit 111 designates address ADA=ADD0, and the register 130 outputs data RDT=DT0 that is the data at a register address that corresponds to the address ADD0. DT0 serves as the setting data. The selector 112 selects data RDT when address ADA=ADD0, and outputs the selected data RDT as data SDT. The computation unit 113 executes CRC computation on the data SDT=DT0, and outputs CRC value CRCQ=EDD0 that is the result of computation. Also, the access control unit 111 outputs address ADB=ADD0, data DTB=SDT=DT0, and a write signal to the nonvolatile memory 10. The nonvolatile memory 10 writes the setting data DT0 to the memory area with the address ADD0.

Next, in the same manner as described above, the access control unit 111 sequentially designates address ADA=ADD1 to ADD15. The selector 112 selects output data of the register 130 when address ADA=ADD1 to ADD15, and outputs data SDT=DT1 to DT15. DT1 to DT15 serve as the setting data. The computation unit 113 obtains CRC value CRCQ=EDD1 to EDD15 based on the previously obtained CRC value and the input data SDT=DT1 to DT15. The access control unit 111 outputs address ADB=ADD1 to ADD15, data DTB=SDT=DT1 to DT15, and a write signal to the nonvolatile memory 10. The nonvolatile memory 10 writes the setting data DT1 to DT15 to the memory areas with the addresses ADD1 to ADD15.

Next, the access control unit 111 designates address ADA=ADD16. If address ADA=ADD16, the selector 112 selects CRC value CRCQ=EDD15, and outputs the selected CRC value CRCQ=EDD15 as data SDT. The access control unit 111 outputs address ADB=ADD16, data DTB=SDT=EDD15, and a write signal to the nonvolatile memory 10. The nonvolatile memory 10 writes CRC value EDD15 to the memory area with the address ADD16. The CRC value EDD15 serves as the above-described error detection data.

Next, operations performed during loading will be described. As shown in FIG. 5, the access control unit 111 outputs address ADB=ADD0 and a readout signal to the nonvolatile memory 10. The nonvolatile memory 10 outputs data DTC=DT0' that is the data in the memory area that corresponds to the address ADD0. The access control unit 111 outputs data DTD=DTC to the computation unit 113. The computation unit 113 executes CRC computation on the data DTC, and outputs CRC value CRCQ=CPD0 that is the result of computation.

Next, in the same manner as described above, the access control unit 111 outputs address ADB=ADD1 to ADD15 and a readout signal to the nonvolatile memory 10. The nonvolatile memory 10 outputs data DTC=DT1' to DT15' that is the data in the memory areas that correspond to the addresses ADD1 to ADD15. The access control unit 111 outputs data DTD=DTC to the computation unit 113. The computation unit 113 executes CRC computation on the previously obtained CRC value and the input data DTD=DT1' to DT15', and outputs CRC value CRCQ=CPD1 to CPD15 that is the result of computation.

Next, the access control unit 111 outputs address ADB=ADD16 and a readout signal to the nonvolatile memory 10. The nonvolatile memory 10 outputs data DTC=EDD15 that is the data in the memory area that corresponds to the address ADD16. The access control unit 111 outputs data DTD=DTC to the comparison unit 114. The comparison unit 114 compares DTD=EDD15 that is the error detection data with CRCQ=CPD15 that is the comparison data, and outputs a signal obtained as a comparison result to the counter 115. CPD15=EDD15 is obtained if there is no anomaly in the data read out from the nonvolatile memory 10, or in other words, if DT0'=DT0, and =DT1, . . . , DT15'=DT15. On the other hand, CPD15≠EDD15 is obtained if there is an anomaly in the data read out from the nonvolatile memory 10. If CPD15≠EDD15, the counter 115 increments the count value. If the count value reaches a predetermined number n, the counter 115 activates an error detection signal SDET. n is an integer of 1 or more. Here, outputting the error detection signal corresponds to activating the error detection signal SDET. A configuration is also possible in which the counter 115 is omitted, and the error detection signal SDET is activated if the comparison unit 114 determines that CPD15≠EDD15.

According to the present embodiment, the setting data written to the register 130 by the processing apparatus 310 can be programmed to the nonvolatile memory 10. It is also possible to determine the error detection data during programming, and store the error detection data into the nonvolatile memory 10 together with the setting data. With this configuration, it is only necessary to transmit the setting data to the circuit apparatus 100 from the processing apparatus 310, and because the error detection data is automatically generated in the circuit apparatus 100, the procedure during programming executed by the processing apparatus 310 can be simplified.

Also, in the present embodiment, the number of times that a comparison result indicates that the error detection data and the comparison data do not match each other is counted, and if the count value reaches n, the error detection signal SDET is activated.

With this configuration, it is determined that an error has occurred if the number of times that the error detection data and the comparison data do not match each other reaches n. If n 2, and if the number of times that the error detection data and the comparison data do not match each other is less than or equal to n−1, the error detection signal SDET is not activated. For example, there may be a case where an anomaly occurs in the setting data read out from the nonvolatile memory 10 due to noise or the like. In this case, the setting data stored in the nonvolatile memory 10 is considered as being normal, and it is therefore desirable to not determine that an error has occurred. According to the present embodiment, if the error detection data and the comparison data temporarily do not match each other due to noise or the like, the error detection signal SDET is not activated. That is, the error detection signal SDET is activated only if it is determined that the error detection data and the comparison data do not match each other continuously n times.

3. Second Configuration Example

Figure 6:
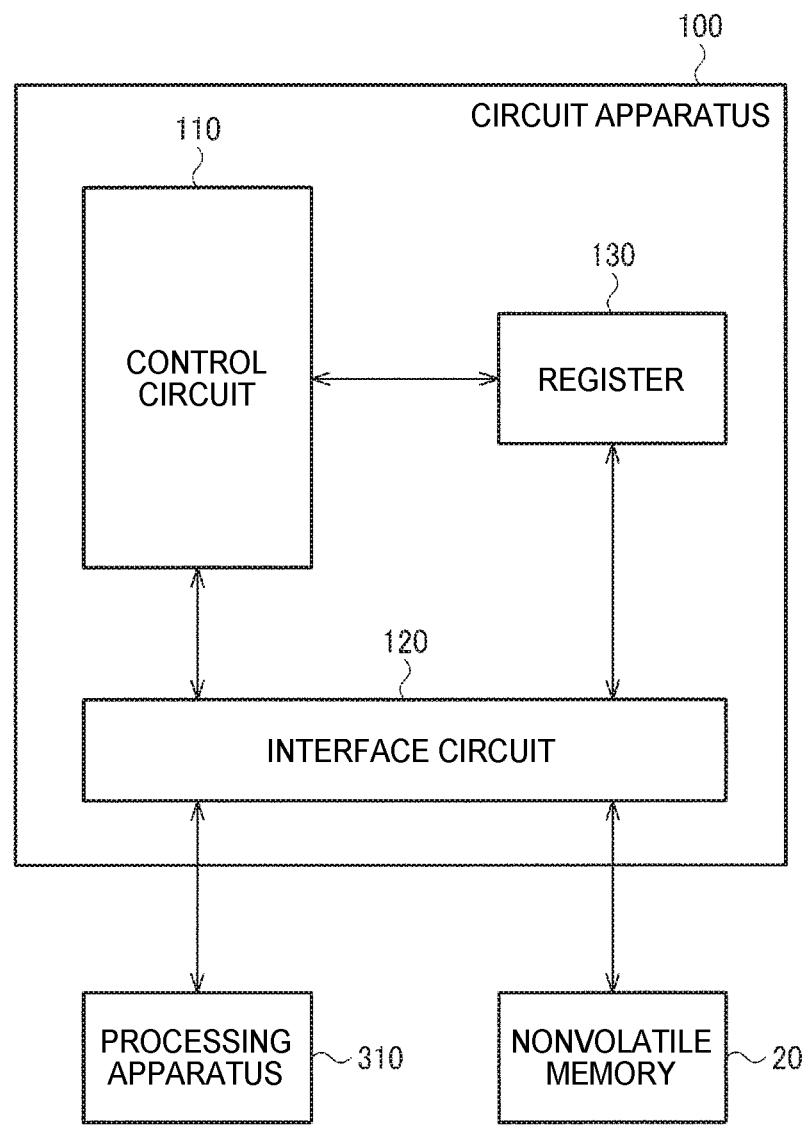
FIG. 6 is a second configuration example of a circuit apparatus.

FIG. 6 shows a second configuration example of a circuit apparatus 100. The circuit apparatus 100 includes a control circuit 110, an interface circuit 120, and a register 130. Constituent elements that are the same as those already described above are given the same reference numerals, and a description of the constituent elements may be omitted as appropriate.

As shown in FIG. 6, a nonvolatile memory 20 is provided outside of the circuit apparatus 100, and the interface circuit 120 performs communication between the nonvolatile memory 20 and the circuit apparatus 100. That is, during programming, the control circuit 110 outputs an address, data, and a write signal to the interface circuit 120, and the interface circuit 120 transmits the address, the data, and the write signal to the nonvolatile memory 20. The nonvolatile memory 20 writes the data to a memory area designated by the address. The data includes the setting data read out from the register 130 and the error detection data obtained from the setting data. During loading, the control circuit 110 outputs an address and a readout signal to the interface circuit 120, and the interface circuit 120 transmits the address and the readout signal to the nonvolatile memory 20. The nonvolatile memory 20 reads out data from the memory area designated by the address, and transmits the data to the interface circuit 120. The interface circuit 120 writes the received data to the register 130, and outputs the data to the control circuit 110. The data includes the setting data and the error detection data. The control circuit 110 obtains comparison data from the setting data, and compares the comparison data with the error detection data. Detailed operations are the same as those described with reference to FIGS. 3 to 5.

4. Electro-Optical Apparatus

Figure 7:
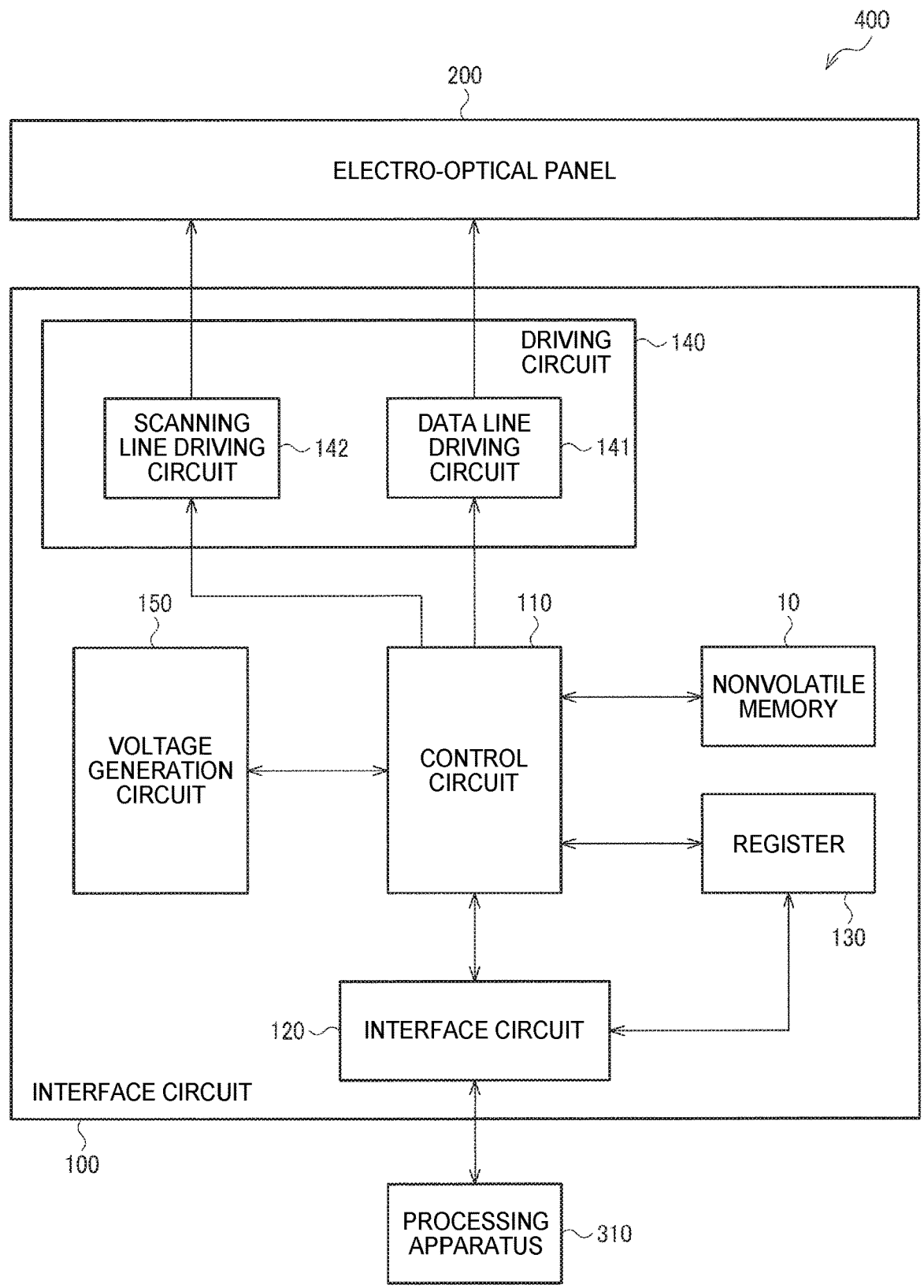
FIG. 7 is a configuration example of an electro-optical apparatus.

FIG. 7 shows a configuration example of an electro-optical apparatus 400 that includes a circuit apparatus 100. The electro-optical apparatus 400 includes an electro-optical panel 200 and a circuit apparatus 100. In this case, the circuit apparatus 100 is a display driver that drives the electro-optical panel 200.

The electro-optical panel 200 includes a pixel array, a plurality of scanning lines, and a plurality of data lines. One scanning line and one data line are connected to each pixel of the pixel array. When a scanning line is selected, the voltage of data lines is written to the pixels connected to the selected scanning line. The voltage of data lines is also referred to as "data voltage". The electro-optical panel 200 may be, for example, a liquid crystal display panel, or an EL (Electro Luminescence) display panel.

The circuit apparatus 100 includes a nonvolatile memory 10, a control circuit 110, an interface circuit 120, a register 130, a driving circuit 140, and a voltage generation circuit 150. Constituent elements that are the same as those already described above are given the same reference numerals, and a description of the constituent elements may be omitted as appropriate.

The driving circuit 140 drives the electro-optical panel 200. The driving circuit 140 includes a scanning line driving circuit 142 that drives the scanning lines and a data line driving circuit 141 that drives the data lines. The scanning line driving circuit 142 includes a buffer circuit that drives the scanning lines using a selection signal. The data line driving circuit 141 includes a D/A conversion circuit that performs D/A conversion so as to convert display data to a gray-scale voltage, and an amplifier circuit that amplifies or buffers the gray-scale voltage and outputs a data voltage. The data lines are driven as a result of the amplifier circuit outputting the data voltage to the data lines.

The interface circuit 120 receives the display data and a timing signal from the processing apparatus 310, and outputs the display data and the timing signal to the control circuit 110. The timing signal includes, for example, a vertical synchronization signal, a horizontal synchronization signal, and a pixel clock signal. The control circuit 110 outputs the display data to the data line driving circuit 141. Also, the control circuit 110 outputs a control signal to the scanning line driving circuit 142, and the scanning line driving circuit 142 drives the scanning lines based on the control signal. The control circuit 110 controls the timing of execution of these control operations based on the timing signal.

The voltage generation circuit 150 generates various types of voltages used by the circuit apparatus 100 based on the power supplied from the outside of the circuit apparatus 100. Specifically, the various types of voltages include a power supply voltage of the amplifier circuit included in the data line driving circuit 141, a gray-scale voltage to be supplied to the D/A conversion circuit included in the data line driving circuit 141, a common voltage supplied to a common electrode included in the electro-optical panel 200, and the like.

The setting data stored in the nonvolatile memory 10 is data that is used to set the operations of the circuit apparatus 100 that is a display driver. Specifically, the setting data includes data that is used to set the power supply voltage of the amplifier circuit, the gray-scale voltage, and the common voltage described above. Also, the setting data includes data indicating the effective number of pixels of the electro-optical panel 200. The effective number of pixels is represented by, for example, the number of scanning lines and the number of data lines. The control circuit 110 loads the setting data from the nonvolatile memory 10 to the register 130, and controls the above-described voltages based on the setting data loaded to the register 130. Also, after the initial loading of the setting data, the setting data may be regularly reloaded from the nonvolatile memory 10 to the register 130. Such an operation is referred to as "refresh operation". For example, in an environment with a large amount of noise such as in a vehicle-mounted electronic device, the content stored in the register 130 may change due to noise. In this case, by performing a refresh operation, the content stored in the register 130 can be overwritten with normal setting data.

In the present embodiment, when the setting data is first loaded from the nonvolatile memory 10 to the register 130, and when a refresh operation is performed, the control circuit 110 generates comparison data, and compares the comparison data with the error detection data. Then, if the number of times that the error detection data and the comparison data do not match each other reaches n, the control circuit 110 outputs an error detection signal.

In the case where the setting data stored in the nonvolatile memory 10 has changed over time and has an anomaly, even if a refresh operation is performed, the content stored in the register 130 does not return to the normal state. In this case, the driving circuit 140 operates according to a voltage that is based on the anomalous setting data, which may cause, for example, a display error, or the like. According to the present embodiment, such an anomaly is detected, and the processing apparatus 310 can be notified of the anomaly using the error detection signal.

Figure 8:
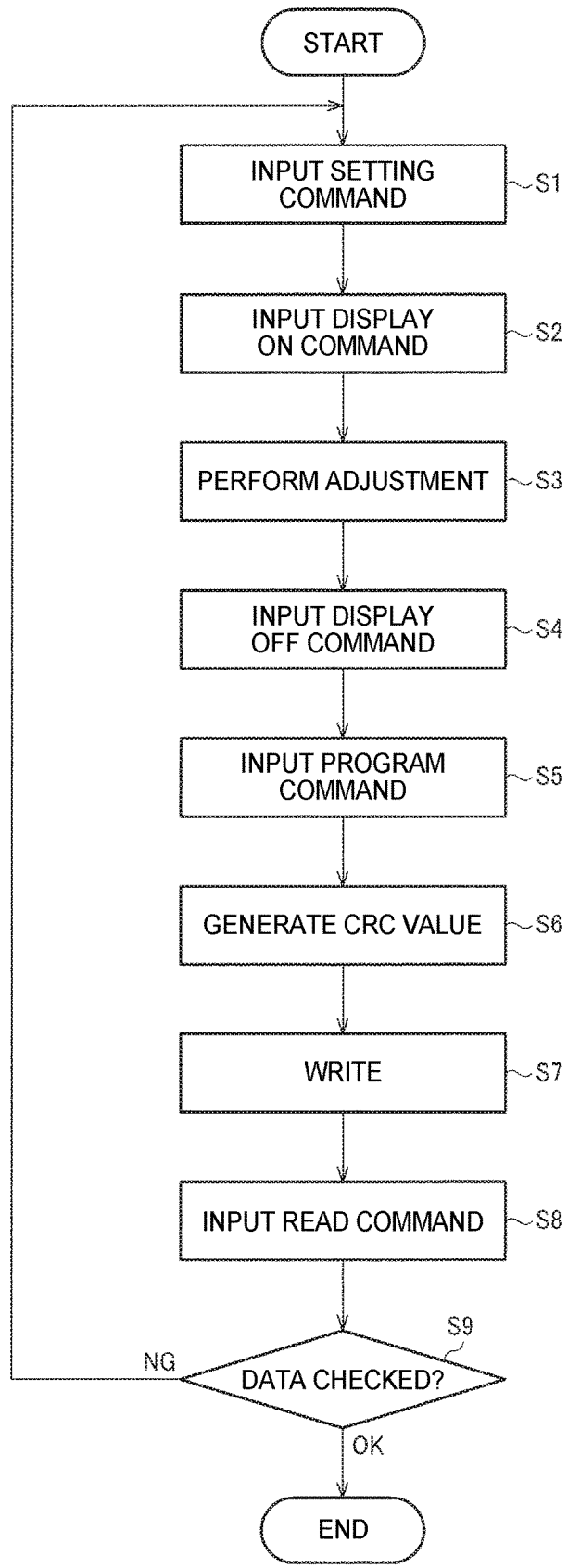
FIG. 8 is a flowchart illustrating the procedure of processing performed in an electro-optical apparatus during programming.

FIG. 8 is a flowchart illustrating the procedure of processing performed in the electro-optical apparatus 400 during programming. The flowchart is executed in a state in which the electro-optical panel 200 and the circuit apparatus 100 are connected.

As shown in step S1 in FIG. 8, the processing apparatus 310 inputs a setting command to the circuit apparatus 100. The setting command includes setting data indicating the effective number of pixels, and the setting data is written to the register 130. Next, as shown in step S2, the processing apparatus 310 inputs a display on command to the circuit apparatus 100. The control circuit 110 starts driving the electro-optical panel 200 based on the display on command.

Next, as shown in step S3, adjustment is performed according to the display characteristics of the electro-optical panel 200. For example, an operator who makes adjustments adjusts the setting data including the power supply voltage of the amplifier circuit, the gray-scale voltage, and the common voltage while viewing a displayed image. The operator makes the adjustment by changing the setting data transmitted from the processing apparatus 310 to the circuit apparatus 100. After the adjustment, the setting data that has undergone the adjustment is stored in the register 130.

Next, as shown in step S4, the processing apparatus 310 inputs a display off command to the circuit apparatus 100. The control circuit 110 stops driving the electro-optical panel 200 based on the display off command. Next, as shown in step S5, the processing apparatus 310 inputs a program command to the circuit apparatus 100. The control circuit 110 executes steps S6 and S7 based on the program command.

As shown in step S6, the control circuit 110 reads out the setting data from the register 130, and generates a CRC value. Next, as shown in step S7, the control circuit 110 writes the setting data and the CRC value to the nonvolatile memory 10.

Next, as shown in step S8, the processing apparatus 310 inputs a read command to the circuit apparatus 100. The control circuit 110 reads out the setting data from the nonvolatile memory 10 based on the read command, and transmits the setting data to the processing apparatus 310. As shown in step S9, the processing apparatus 310 compares the received setting data with original settings, and ends the processing if it is determined that the received setting data is normal. If it is determined that the received setting data is not normal, the processing apparatus 310 returns the processing to step S1.

As described above, the processing apparatus 310 only transmits the setting data to the circuit apparatus 100, and a CRC value that serves as the error detection data is automatically generated in the circuit apparatus 100 and written to the nonvolatile memory 10.

An example has been described with reference to FIG. 8 in which the processing apparatus 310 and the electro-optical apparatus 400 are connected to each other, and the processing apparatus 310 executes steps S1 to S5, S8, and S9, but the present embodiment is not limited thereto. For example, a configuration is possible in which a programming apparatus is connected to the electro-optical apparatus 400, and the programming apparatus executes steps S1 to S5, S8, and S9.

5. Electronic Device and Mobile Unit

Figure 9:
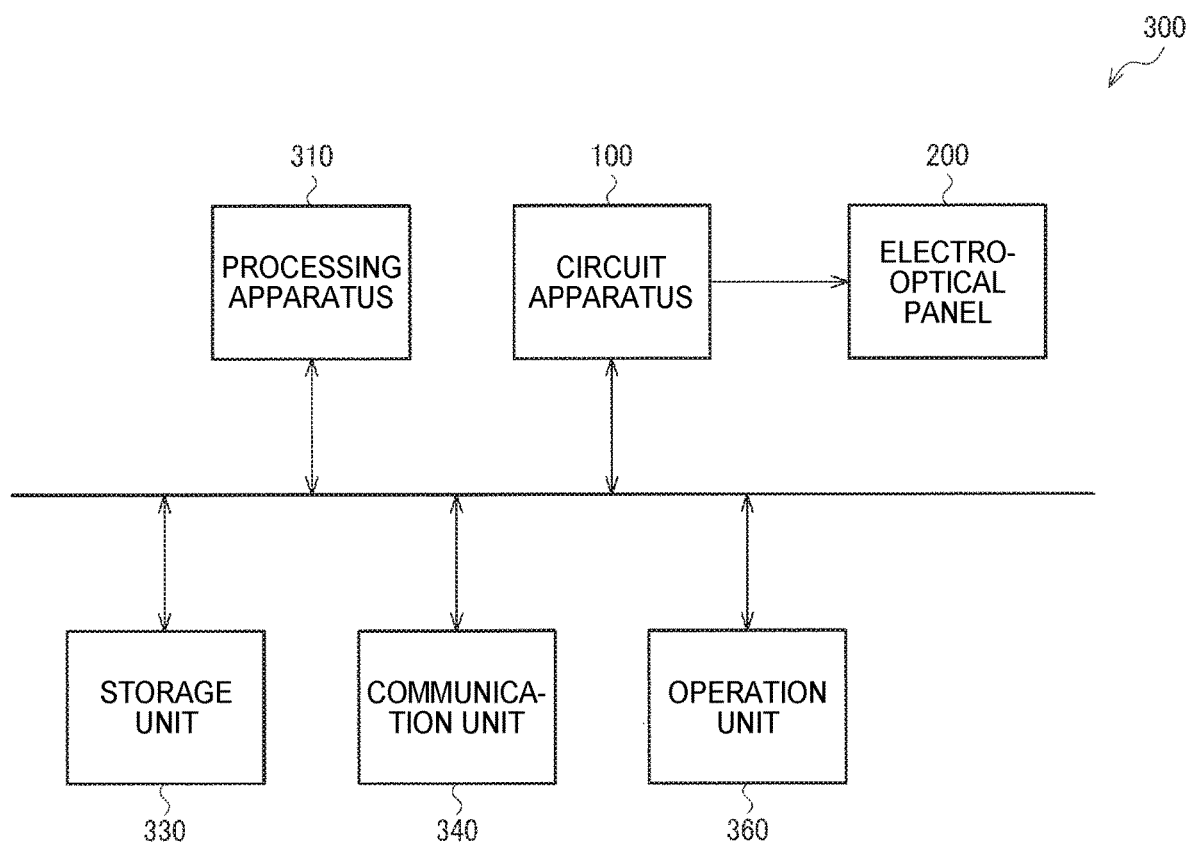
FIG. 9 is a configuration example of an electronic device.

FIG. 9 shows a configuration example of an electronic device 300 that includes a circuit apparatus 100. The electronic device 300 includes a processing apparatus 310, a circuit apparatus 100, an electro-optical panel 200, a storage unit 330, a communication unit 340, and an operation unit 360. The circuit apparatus 100 may also be referred to as "display driver". The storage unit 330 may also be referred to as "storage device" or "memory". The communication unit 340 may also be referred to as "communication circuit" or "communication apparatus". The operation unit 360 may also be referred to as "operation apparatus". Specific examples of the electronic device 300 may include various types of electronic devices on which a display apparatus is mounted. For example, the electronic device 300 may be a vehicle-mounted apparatus, a projector, a head mount display, a personal digital assistant, a portable game terminal, an information processing apparatus, or the like. The vehicle-mounted apparatus may be, for example, an instrument panel, a car navigation system, or the like.

The operation unit 360 is a user interface that receives various types of operations from the user. The operation unit 360 may be composed of, for example, buttons, a mouse, a keyboard, a touch panel attached to the electro-optical panel 200, or the like. The communication unit 340 is a data interface that inputs and outputs image data and control data. The communication unit 340 may be, for example, a wireless communication interface such as a wireless LAN or near-field communication, or a wired communication interface such as a wired LAN or a USB. The storage unit 330 stores data input from, for example, the communication unit 340, or functions as a working memory for the processing apparatus 310. The storage unit 330 may be, for example, a memory such as a RAM or a ROM, a magnetic storage device such as a HDD, or an optical storage device such as a CD drive or a DVD drive. The processing apparatus 310 processes image data input from the communication unit 340 or stored in the storage unit 330, and transfers the processed image data to the circuit apparatus 100. The circuit apparatus 100 causes the electro-optical panel 200 to display an image based on the image data transferred from the processing apparatus 310. Also, the processing apparatus 310 performs control processing for controlling the electronic device 300, various types of signal processing operations, and the like. The processing apparatus 310 may be, for example, a processor such as a CPU or an MPU, or an ASIC.

Figure 10:
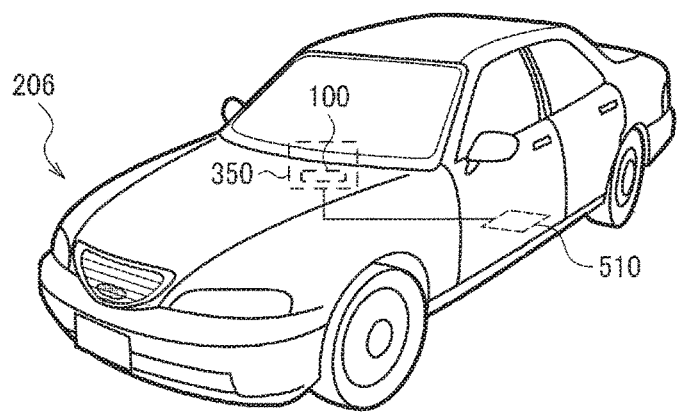
FIG. 10 is an example of a mobile unit.

FIG. 10 shows a configuration example of a mobile unit that includes a circuit apparatus 100 according to the present embodiment. The mobile unit is a device or an apparatus that moves on ground, in the air, or on sea, and includes, for example, a driving mechanism such as an engine or a motor, a steering mechanism such as a steering wheel or a rudder, and various types of electronic devices. The mobile unit according to the present embodiment may be, for example, a vehicle, an aircraft, a motorcycle, a marine vessel, a robot, or the like.

FIG. 10 schematically shows an automobile 206 that is a specific example of the mobile unit. The automobile 206 includes a display apparatus 350 that includes a circuit apparatus 100, and an ECU 510 that controls the units of the automobile 206. The display apparatus 350 is an electro-optical apparatus. The ECU 510 generates an image to be presented to the user, and transmits the generated image to the display apparatus 350. The display apparatus 350 displays the received image on the display apparatus 350. For example, information including the vehicle speed, the fuel level, the travel distance, various types of apparatus settings, and the like is displayed in the form of an image.

According to the embodiment described above, the circuit apparatus includes: an interface circuit that receives setting data; and a control circuit that controls the operations of the circuit apparatus based on the setting data and also controls access to a nonvolatile memory. The control circuit generates error detection data based on the setting data received by the interface circuit, and writes the setting data and the error detection data to the nonvolatile memory.

The error detection data is generated based on the setting data received by the interface circuit, and the setting data and the error detection data are written to the nonvolatile memory. With this configuration, it is unnecessary to compute the error detection data outside of the circuit apparatus. That is, as a result of the processing apparatus simply transmitting the setting data to the circuit apparatus, the circuit apparatus automatically generates the error detection data internally. It is thereby possible to simplify the procedure for storing the error detection data into the nonvolatile memory.

Also, in the present embodiment, the control circuit includes a computation unit. The computation unit may generate the error detection data based on the setting data received by the interface circuit.

With this configuration, the computation unit can generate the error detection data based on the setting data. Also, the control circuit can write the error detection data and the setting data to the nonvolatile memory.

Also, in the present embodiment, the circuit apparatus may include a register. The interface circuit may write the received setting data to the register. The control circuit may generate the error detection data based on the setting data written to the register.

With this configuration, after the processing apparatus has transmitted the setting data to the interface circuit, the setting data is written to the register, and the error detection data is generated from the setting data written to the register. As described above, as a result of the processing apparatus simply transmitting the setting data to the circuit apparatus, the circuit apparatus automatically generates the error detection data internally.

Also, in the present embodiment, the control circuit may read out the setting data and the error detection data from the nonvolatile memory, and generate comparison data to be compared with the error detection data based on the setting data read out from the nonvolatile memory.

With this configuration, the setting data and the error detection data are read out from the nonvolatile memory, and the comparison data is generated based on the read-out setting data. It is thereby possible to generate the comparison data to be compared with the error detection data.

Also, in the present embodiment, the control circuit may compare the error detection data and the comparison data.

In the case where the setting data read out from the nonvolatile memory is different from the setting data programmed in the nonvolatile memory, the error detection data and the comparison data do not match each other. According to the present embodiment, it is determined whether or not the error detection data and the comparison data match each other by comparing the error detection data and the comparison data. It is thereby possible to determine whether or not the setting data read out from the nonvolatile memory is normal.

Also, in the present embodiment, the control circuit includes a comparison unit. Also, the comparison unit may compare the error detection data and the comparison data.

With this configuration, the comparison unit can compare the error detection data and the comparison data. Also, the control circuit can determine, based on the comparison result, whether or not the error detection data and the comparison data match each other.

Also, in the present embodiment, the control circuit may output an error detection signal based on the comparison result.

As described above, it is possible to determine, based on the comparison result, whether or not the setting data read out from the nonvolatile memory is normal. That is, as a result of the error detection signal being output based on the comparison result, the error detection signal can be output based on the result of determination that there is an anomaly in the setting data read out from the nonvolatile memory.

Also, in the present embodiment, the control circuit may count the number of times that the comparison result indicates that the error detection data and the comparison data do not match each other, and output an error detection signal if the count value reaches n (where n is an integer or 1 or more).

According to the present embodiment, the number of times that the error detection data and the comparison data do not match each other does not reach n, the error detection signal is not output. Also, if n 2, the error detection signal SDET is activated only if it is determined that the error detection data and the comparison data do not match each other continuously n times. For example, an anomaly may occur in the setting data read out from the nonvolatile memory due to noise or the like. In this case, even if the setting data stored in the nonvolatile memory is normal, an anomaly may be detected in the nonvolatile memory. If n 2, and if the error detection data and the comparison data temporarily do not match each other due to noise or the like, the error detection signal is not output.

Also, in the present embodiment, the circuit apparatus may include the nonvolatile memory.

The data stored in the nonvolatile memory may change over time. Also, for example, data may not be read out properly from the nonvolatile memory due to a circuit failure such as a failure in the readout control circuit. Even if there is an anomaly in the setting data, depending on the anomaly, the circuit apparatus can be operated. However, it is generally desirable to operate the circuit apparatus at normal settings. According to the present embodiment, if an anomaly occurs in the setting data stored in the nonvolatile memory, the anomaly can be detected.

Also, in the present embodiment, the circuit apparatus may include a driving circuit that drives an electro-optical panel. The setting data may be data that is used to set a voltage used by the driving circuit.

In the case where setting data that is not normal is loaded from the nonvolatile memory to the register, the driving circuit is operated by the voltage based on the anomalous setting data, which may cause, for example, a display error, or the like. According to the present embodiment, such an anomaly can be detected, and the processing apparatus can be notified of the anomaly by using the error detection signal.

Also, in the present embodiment, the electro-optical apparatus includes: an electro-optical panel; and the circuit apparatus according to any one of the aspects described above that drives the electro-optical panel.

Also, in the present embodiment, the electronic device includes the circuit apparatus according to any one of the aspects described above.

Also, in the present embodiment, the mobile unit includes the circuit apparatus according to any one of the aspects described above.

The embodiments according to the invention have been described in detail above, but those skilled in the art will readily understand that various modifications can be made from new matter and effects of the invention without departing from the gist of the invention. Accordingly, all of such modifications are also encompassed in the scope of the invention. For example, a term described together with a different term having a broader meaning or the same meaning at least once in the specification or drawings may be replaced by the different term anywhere in the specification or drawings. Also, all combinations of the embodiments and variations of the invention are also encompassed in the scope of the invention. In addition, the configurations and operations of the circuit apparatus, the electro-optical apparatus, the electronic device, and the mobile unit are not limited to those described in the embodiments of the invention, and various modifications can be made thereto.

What is claimed is:

1. A circuit apparatus comprising:
an interface circuit that receives setting data from an external device;
a register that stores the setting data; and
a control circuit that controls operations of the circuit apparatus based on the setting data stored in the register and also controls access to a nonvolatile memory, the nonvolatile memory being a different memory from the register,
wherein the control circuit, in response to a command received from the external device after the setting data stored in the register has been used to control the operations of the circuit apparatus,
reads the setting data from the register,
automatically generates error detection data internally based on the setting data read from the register, the setting data having been received by the interface circuit, and
writes the setting data read from the register and the error detection data to the nonvolatile memory in association with each other, and
the interface circuit receives refreshed setting data from the external device after (i) the control circuit reads out the setting data stored in the nonvolatile memory and (ii) a determination that the setting data read from the nonvolatile memory is different from the setting data read out from the register.

2. The circuit apparatus according to claim 1,
wherein the control circuit includes a computation unit, and the computation unit generates the error detection data.

3. The circuit apparatus according to claim 1,
wherein the interface circuit writes the received setting data to the register.

4. The circuit apparatus according to claim 1,
wherein the control circuit reads out the setting data and the error detection data from the nonvolatile memory, and generates comparison data based on the setting data read out from the nonvolatile memory, the comparison data being data to be compared with the error detection data.

5. The circuit apparatus according to claim 4,
wherein the control circuit compares the error detection data and the comparison data.

6. The circuit apparatus according to claim 5,
wherein the control circuit includes a comparison unit, and
the comparison unit compares the error detection data and the comparison data.

7. The circuit apparatus according to claim 5,
wherein the control circuit outputs an error detection signal based on a comparison result.

8. The circuit apparatus according to claim 5,
wherein the control circuit counts the number of times that a comparison result indicates that the error detection data and the comparison data do not match each other, and outputs an error detection signal if the count value reaches n (where n is an integer of 1 or more).

9. The circuit apparatus according to claim 1, comprising the nonvolatile memory.

10. The circuit apparatus according to claim 1, further comprising
a driving circuit that drives an electro-optical panel,
wherein the setting data is data that is used to set a voltage used by the driving circuit.

11. An electro-optical apparatus comprising:
an electro-optical panel; and
the circuit apparatus according to claim 1 that drives the electro-optical panel.

12. An electronic device comprising:
the circuit apparatus according to claim 1.

13. A mobile unit comprising:
the circuit apparatus according to claim 1.

* * * * *